United States Patent [19]

Evans

[11] Patent Number: 5,054,233

[45] Date of Patent: Oct. 8, 1991

[54] HYDROPONIC APPARATUS

[76] Inventor: David A. Evans, 12059 Alta Carmel Ct. #168, San Diego, Calif. 92128

[21] Appl. No.: 371,630

[22] Filed: Jun. 26, 1989

[51] Int. Cl.⁵ .............................................. A01G 31/00
[52] U.S. Cl. ........................................... 47/62; 47/60
[58] Field of Search .......................... 47/59, 60, 62, 63

[56] References Cited

U.S. PATENT DOCUMENTS

| | | | |
|---|---|---|---|
| 2,198,150 | 4/1940 | Barnhart | 47/62 |
| 2,674,828 | 4/1954 | Tegner | 47/1.2 |
| 2,747,331 | 5/1956 | Steiner | 47/1.2 |
| 3,451,162 | 6/1969 | Rasmussen | 47/62 |
| 4,170,844 | 10/1979 | Steele | 47/62 |
| 4,310,990 | 1/1982 | Payne | 47/62 |
| 4,334,386 | 6/1982 | Burcombe | 47/62 |
| 4,603,506 | 8/1986 | Powell, Jr. | 47/62 |

Primary Examiner—Henry E. Raduazo
Attorney, Agent, or Firm—Knobbe, Martens, Olson & Bear

[57] ABSTRACT

A hydroponic apparatus providing a controlled environment for plant growth including artificial light and periodic flushing with a liquid nutrient. Plant growing containers filled with growth media mounted horizontally on a box like structure containing an air tight storage container for liquid plant nutrient extending beneath the enclosures containing the plant containers. Compressed air admitted to the storage tank forces the nutrient liquid up, through the laminated filter section, into the plant container from which the nutrient drains back into the storage tank. A canopy over the assembly contains electric growth lamps and a roll up trellis.

9 Claims, 3 Drawing Sheets

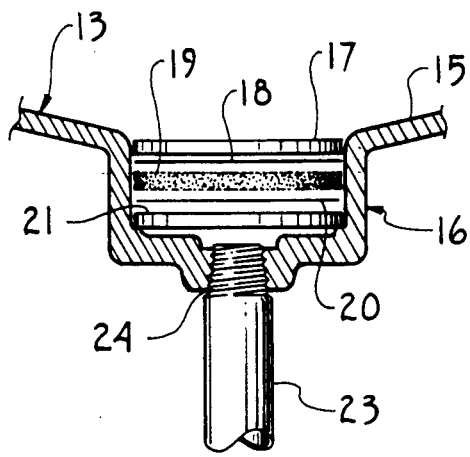
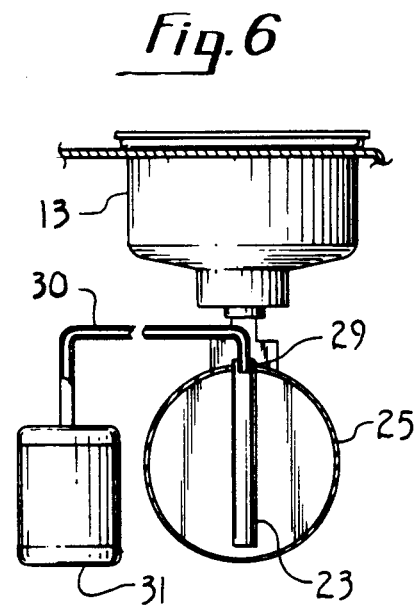
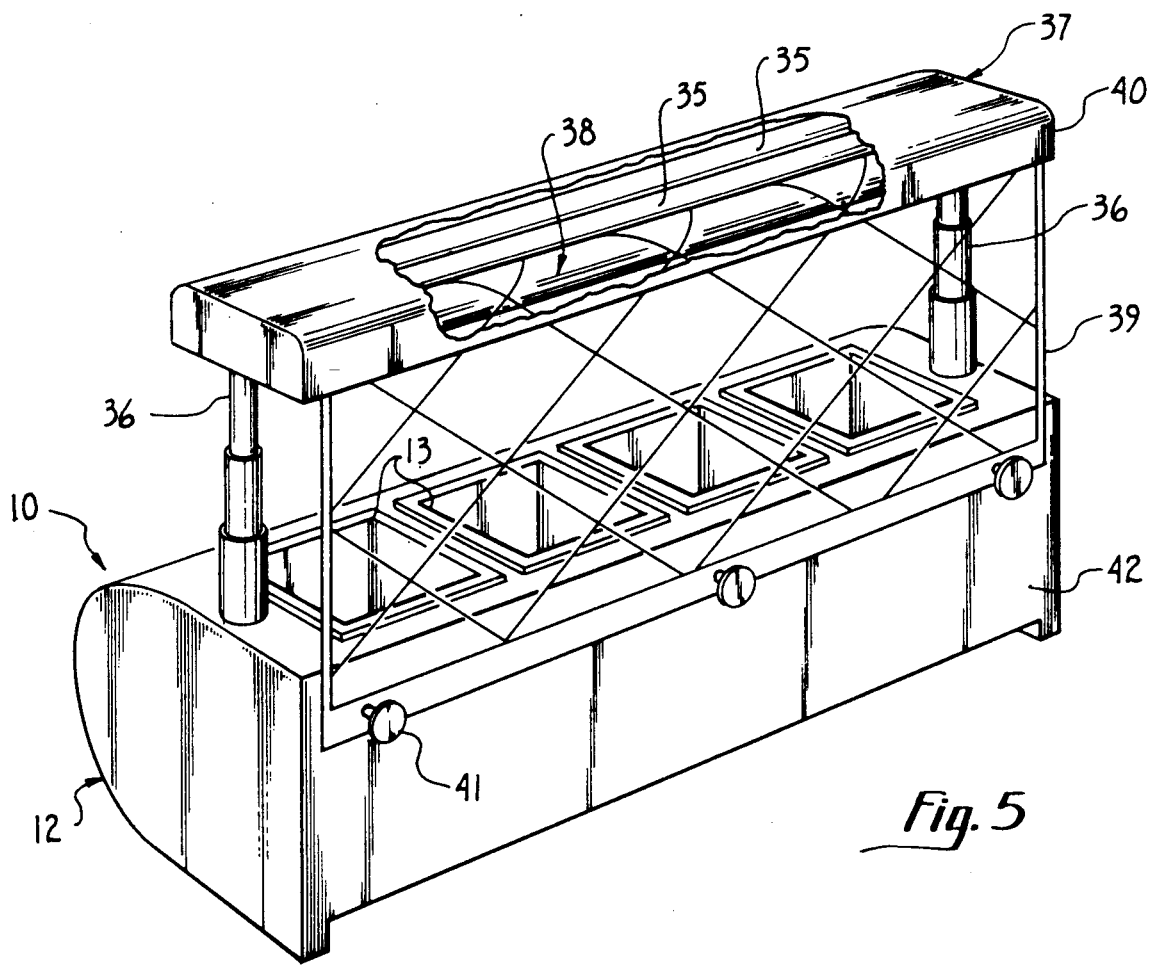

HYDROPONIC APPARATUS

BACKGROUND OF THE INVENTION

1. Field of the Invention

This invention relates generally to a hydroponic plant growing apparatus wherein the plant growing tray is provided with a fluid nutrient growing solution from an associate storage chamber.

1. Description of the Prior Art

Hydroponic devices for the growing of agriculture plants are old in the prior art. U.S. Pat. No. 2,674,828 to Tagner, discloses growing trays in an upper layer over tanks containing a nutrient solution in a lower layer. The device utilizes pumping stations to circulate the temperature controlled solution. U.S. Pat. No. 4,603,506 to Powell, Jr. discloses a plant growing tray from which the fluid drains into a lower storage tank from which it is recirculated air pressure. A timer device controls the periodic circulation of the fluid.

SUMMARY OF THE INVENTION

A hydroponic plant growing apparatus providing growing media, light, and water with fertilizer to plants and other vegetation is provided. There is a plurality of growing chambers, each chamber having a porous liner filled with a plant growth media removably placed within. A bottom section of the growing chamber tapers downwardly to a filter section that is part of the chamber. There are a plurality of filters in the filter section. The filters included are a perforated plastic first filter, a second filter comprising a screen having a plurality of openings per square centimeter, an open cell reticulated plastic foam third filter, a fourth filter comprising a screen having a plurality of openings per square centimeter, and a perforated plastic fifth filter. The preferred foam third filter is described by the manufacturer as having 50 to 100 openings per square centimeter. There is a nutrient transfer tube attached to and passing through a port in the filter section and extending downwardly to an air tight plant nutrient tank in the box like structure.

A hydroponic plant growing apparatus may have a first seal, to reduce leakage between the liner and the growing chamber, on the liner; a second seal, to reduce leakage between the transfer tube and the nutrient tank, in the tank; and a third seal, to reduce leakage between an air line extending from an air source to the nutrient tank, around the air line and in the tank. Preferably, a fourth seal is located at the base of the filter section, between the filter section and the transfer tube. The seals may be O-rings as shown in the drawings, grommet or other seals. The third seal is preferably a welded seam as shown in the drawings. The compressed air source, in the box like structure, may pressurize the nutrient tank through the air line and may force nutrients and water through the transfer tube, through the plurality of filters in the filter section, into the chamber, through the liner and into the growth media. There may be a relief valve in a top portion of the plant nutrient tank. There may be at least one electronic timing device to start and stop the compressed air source, such as a compressor, at selected intervals to allow the nutrient tank to be pressurized and depressurized and at least one electric timing device to selectively operate at least one growing light. An amount of water and nutrients may return to the nutrient tank from the growing chamber after the timer turns off the compressed air source and the relief valve opens allowing the nutrient tank to be depressurized. The relief valve may be electronically operated and open and close electronically, at selected intervals, in cooperation with the compressed air supply that pressurizes the nutrient tank. One electronic timing device may operate the compressed air supply, the relief valve and the growing lights.

A hydroponic plant growing apparatus may be enclosed in a box like structure and may have at least one telescopic rod attached to and extending from the box like structure to support a canopy containing at least one electric, plant growing light. There may be a longitudinal, spring loaded, roller containing a pull-down trellis arrangement and extending along a length of a back side of the canopy. A plurality of fasteners, may be connected to a back side of the box like structure to releasably secure the trellis arrangement to the back side of the box like structure.

A method of growing plants and other vegetation has steps which include, among others, providing a box like structure and placing a plurality of growing chambers in the box like structure, and removably placing a porous liner filled with a plant growth media within the chamber. Other steps are providing a bottom section of the growing chamber that tapers downwardly to a filter section that is part of the chamber and placing a plurality of filters in the filter section. The filters included as a part of these steps are: a perforated plastic first filter, a second filter comprising a screen having a plurality of openings per square centimeter, and a perforated plastic fifth filter. The filters may be laminated together for ease of replacement. Further steps are attaching a nutrient transfer tube to the filter section and allowing the tube to pass through a port in the filter section and extending the tube downwardly to an air tight plant nutrient tank in the box like structure.

A method of growing plants and other vegetation may include, among others, such steps as: placing a first seal, to reduce leakage between the liner and the growing chamber, on the liner; placing a second seal, to reduce leakage between the transfer tube and the nutrient tank, in the tank; and placing a third seal, to reduce leakage between an air line extending from an air source to the nutrient tank, around the air line and in the tank. Preferably, a fourth seal is located at the base of the filter section, between the filter section and the transfer tube. Other steps may include pressurizing the nutrient tank through the air line by using the compressed air source, in the box like structure, and forcing nutrients and water in the nutrient tank through the transfer tube, through the plurality of filters in the filter section, into the chamber, through the liner and into the growth media.

Additional steps that may be included are providing a relief valve in a top portion of the plant nutrient tank; using at least one electronic timing device to allow the nutrient tank to be pressurized and depressurized at selected time intervals and providing at least one electric timing device to selectively operate at least one growing light; and returning an amount of water and nutrients to the nutrient tank from the chamber after the timer turns off the compressed air source and the relief valve opens to allow the nutrient tank to be depressurized.

A method of growing plants and other vegetation may also include such steps as: attaching to and extending from the box like structure at least one telescopic rod to support a canopy containing at least one electric, plant growing light; placing a longitudinal, spring loaded, roller containing a pull-down trellis arrangement and extending along a length of a back side of the canopy; and connecting a plurality of fasteners to a back side of the box like structure and releasably securing the trellis arrangement to the back side of the box like structure.

BRIEF DESCRIPTION OF THE DRAWINGS

FIG. 1 is a partially sectioned front view of the hydro apparatus;

FIG. 4 is a detailed view of the filter section of the hydroponic apparatus;

FIG. 5 is a top rear perspective view of the hydroponic apparatus.

FIG. 6 is a partial cross-sectional view taken along lines 6—6 and partly in elevation.

DETAILED DESCRIPTION OF THE PREFERRED EMBODIMENTS

Figure 2:
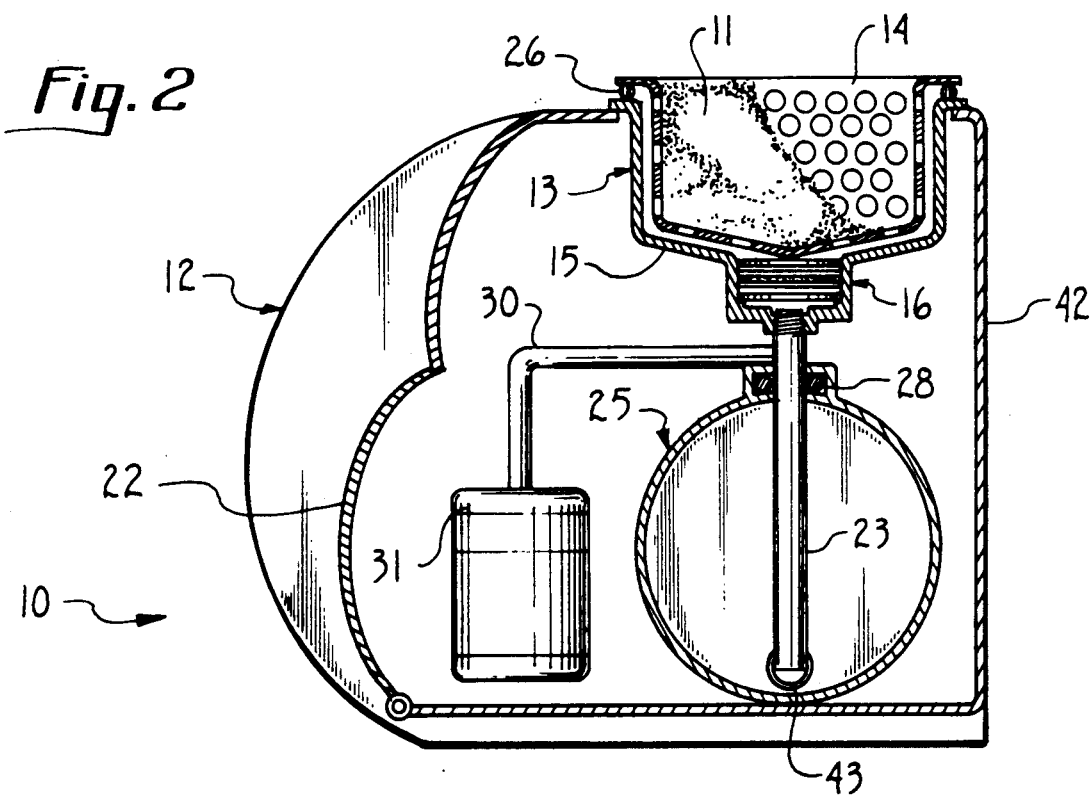
FIG. 2 is an end view of the hydroponic apparatus.
Figure 3:
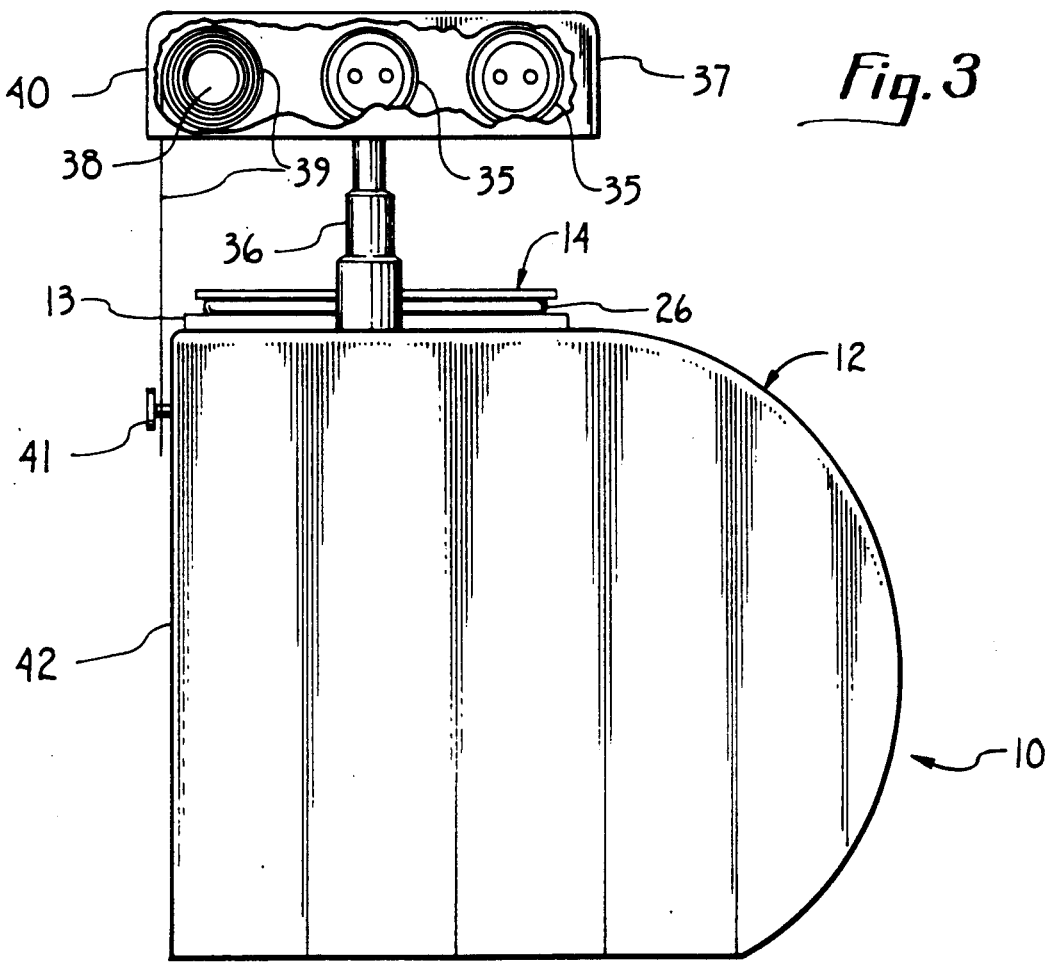
FIG. 3 is a sectional elevation view taken through line 1—1 of FIG. 1.
Figure 2:
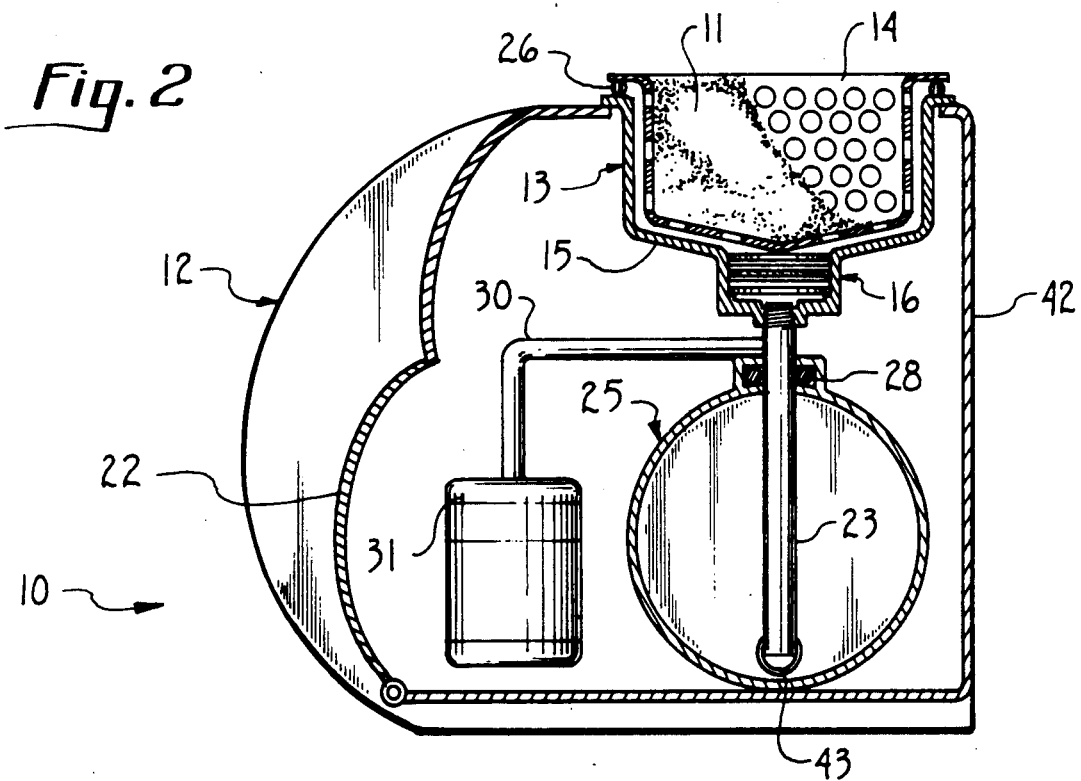
Figure 3:
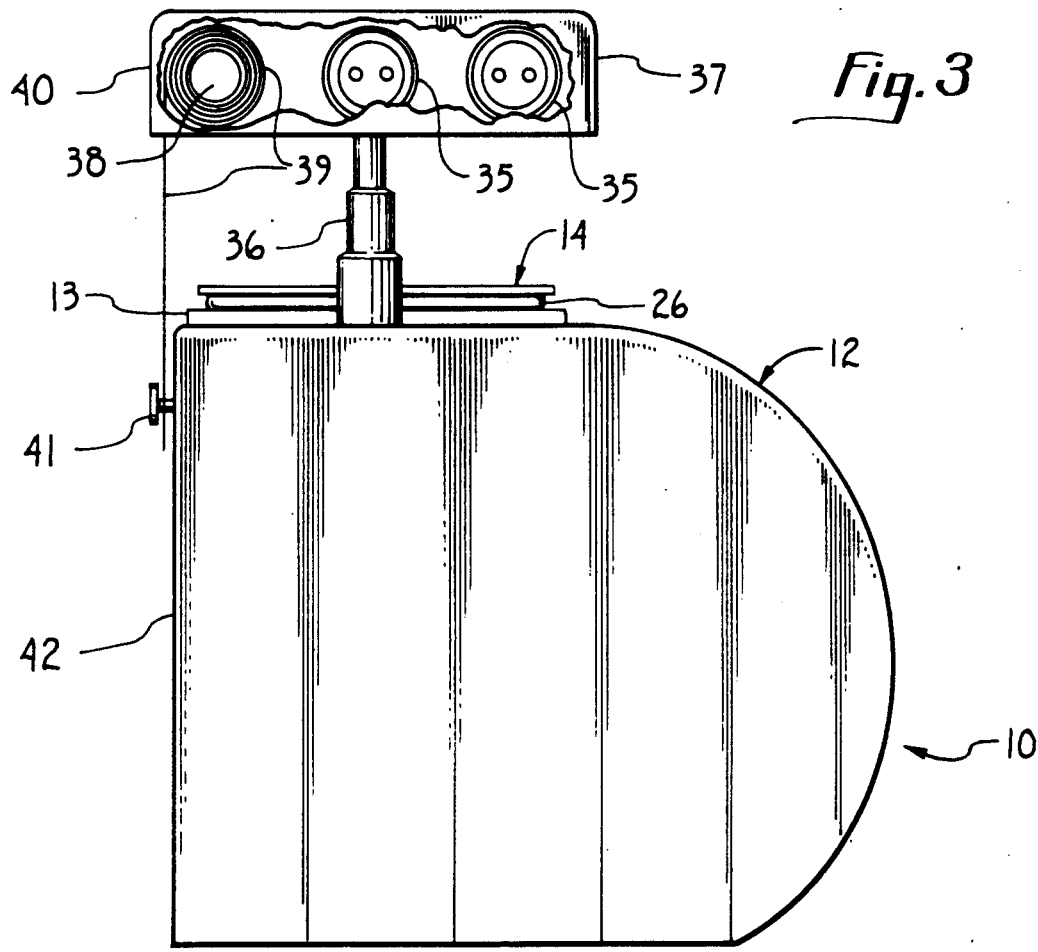

FIGS. 1 through 5 show a hydroponic plant growing apparatus 10 that provides growing media 11, light (not shown, but provided by plant growing lights), and water (not shown) with fertilizer (not shown) to plants (not shown) and other vegetation (not shown) and that has a box like structure 12. The box like structure has a door 22 for access. There are a plurality of growing chambers 13 in the box like structure 12, each chamber 13 having a porous liner 14 filled with a plant growth media 11 removably placed within. A bottom section 15 of the growing chamber 13 tapers downwardly to a filter section 16 that is part of the chamber 13.

There are a plurality of filters in the filter section 16 including a perforated plastic first filter 17, a second filter 18 comprising a screen having a plurality of openings per square centimeter, and an open cell reticulated plastic (a plastic foam) third filter 19. There are also a fourth filter 20 comprising a screen having a plurality of openings per square centimeter, and a perforated plastic fifth filter 21. A nutrient transfer tube 23 is attached to and passes through a port 24 in the filter section 16 and extends downwardly to an air tight liquid plant nutrient tank 25 in the box like structure 12. There is a first seal 26, to reduce leakage between the liner 14 and the growing chamber 13, on the liner 14. There is a second seal 28, to reduce leakage between the transfer tube 23 and the nutrient tank 25, in the tank 25; and a third seal 29, to reduce leakage between an air line 30 extending from an air source 31 to the nutrient tank 25, around the air line 30 and in the tank 25. A fourth seal 52 reduces leakage between the filter section 16 and the transfer tube 23.

As part of the apparatus 10, the compressed air source 31, in the box like structure 12, pressurizes the nutrient tank 25 through the air line 30 and forces nutrients and water through the transfer tube 23, through the plurality of filters 17, 18, 19, 20 and 21 in the filter section 16, into the chamber 13, through the liner 14 and into the growth media 11. There is a relief valve 32 in a top portion 33 of the plan nutrient nutrient tank 25 that opens to depressurize the tank. There is at least one electronic timing device 34, in the box like structure 12, to allow the nutrient tank 25 to be pressurized and depressurized at selected intervals and at least one electronic timing device 50 to selectively operate at least one growing light 35. One of the features of the apparatus 10 is that an amount of water and nutrients returns to the nutrient tank 25 from the chamber 13 after the timer 34 turns off the compressed air source 31 and the relief valve 32 opens to allow the nutrient tank 25 to be depressurized.

At least one telescopic rod 36 is attached to and extends from the box like structure 12 to support a canopy 37 containing at least one electric, plant growing light 35. There is a longitudinal, spring loaded, roller 38 containing a pull-down trellis arrangement 39 and extending along a length of a back side 40 of the canopy 37. A plurality of fasteners 41, connects to a back side 42 of the box like structure 12 and releasably secures the trellis arrangement 39 to the back side 42 of the box like structure 12. There may be a drain plug 43 in an end portion 45 of nutrient tank 25. The plug 43 allows the water and nutrients to be drained from nutrient tank 25 when desired.

A method of growing plants and other vegetation has steps which include, among others, providing a box like structure 12 and placing a plurality of growing chambers 13 in the box like structure, and removably placing a porous liner 14 filled with a plant growth media within the chamber 13. Other steps are providing a bottom section of the growing chamber that tapers downwardly to a filter section 16 that is part of the chamber 13 and placing a plurality of filters in the filter section 16. The filters included as a part of this step are: a perforated plastic first filter 17, a second filter 18 comprising a screen having a plurality of openings per square centimeter, a foam third filter 19, a fourth filter 20 comprising a screen having a plurality of openings per square centimeter, and a perforated plastic fifth filter 21. Further steps are attaching a nutrient transfer tube 23 to the filter section 16 and allowing the tube 23 to pass through a port 24 in the filter section and extending the tube downwardly to an air tight liquid plant nutrient tank 25 in the box like structure 12.

A method of growing plants and other vegetation may include, among others, such steps as: placing a first seal 26, to reduce leakage between the liner 14 and the growing chamber 13, on the liner 14; placing a second seal 28, to reduce leakage between the transfer tube 23 and the nutrient tank 25, in the tank; and placing a third seal 29, to reduce leakage between an air line 30 extending from an air source 31 to the nutrient tank 25, around the line 30 and in the tank 25. A fourth seal 52 reduces leakage between the filter section 16 and the transfer tube 23. Other steps may include pressurizing the nutrient tank 25 through the air line 30 by using the compressed air source 31, in the box like structure 12, and forcing nutrients and water through the transfer tube 23, through the plurality of filters 17, 18, 19, 20 and 21 in the filter section 16, into the chamber 13, through the liner 14 and into the growth media 11.

Additional steps that may be included are providing a relief valve 32 in a top portion 33 of the plan nutrient tank 25; using at least one electronic timing device 34, in the box like structure 12, to allow the nutrient tank 25 to be pressurized and depressurized at selected time intervals and at least one electronic timing device 50 to selectively operate at least one growing light 35; and returning an amount of water and nutrients to the nutrient tank 25 from the chamber 13 after the timer 34 turns off the compressed air source 31 and opening the relief valve 32 to allow the nutrient tank 25 to be depressurized.

A method of growing plants and other vegetation may also include such steps as: attaching to and extending from the box like structure 12 at least one telescopic rod 36 to support a canopy 37 containing at least one electric, plant growing light 35; placing a longitudinal, spring loaded, roller 38 containing a pull-down trellis arrangement 39 and extending along a length of a back side 40 of the canopy 37; and connecting a plurality of fasteners 41 to the back side 42 of the box like structure 12 and releasably securing the trellis arrangement 39 to the back side 42 of the box like structure 12.

I claim:

1. A hydroponic plant growing apparatus providing a growing medium, light, and water with fertilizer to plants and other vegetation comprising:
   a plurality of growing chambers, each chamber having a porous liner filled with a plant growth medium removably placed within;
   a bottom section of the growing chamber tapering downwardly to a filter section that is part of the chamber;
   a plurality of filters in the filter section comprising:
     a perforated plastic first filter;
     a second filter comprising a screen having a plurality of openings per square centimeter;
     a foam third filter;
     a fourth filter comprising a screen having a plurality of openings per square centimeter;
     a perforated plastic fifth filter;
   an airtight plant nutrient tank; and
   a nutrient transfer tube attached to and passing through a port in the filter section and extending downwardly to said air tight plant nutrient tank.

2. A hydroponic plant growing apparatus according to claim 1 further comprising:
   a compressed air source and an air line connected to said air source and said tank, said air line being in fluid communication with said source and said tank, said source being capable of pressurizing said tank for forcing fluid from said tank through said tube, said filter section, said liner, and into said growth medium;
   a first seal positioned on said liner to reduce leakage between the liner and the growing chamber;
   a second seal positioned in said tank to reduce leakage between the transfer tube and the tank;
   a third seal positioned around said air line in said tank to reduce leakage between said air line and said tank;
   a relief valve positioned on said tank to depressurize the tank;
   a growing light positioned in light communication with said box-like structure;
   at least one electronic timing device electrically connected to said relief valve for actuating said valve to allow the tank to be pressurized and depressurized at selected time intervals and at least one electronic timing device electrically connected to said growing light to selectively operate said growing light; and
   an amount of water and nutrients returning to the tank from the chamber after the timer turns off the compressed air source and the relief valve opens to allow the tank to be depressurized.

3. A hydroponic plant growing apparatus as described in claim 1 further comprising:
   at least one telescopic rod attached to and extending from the box like structure to support a canopy containing at least one electric, plant growing light;
   a longitudinal, spring loaded, roller containing a pull-down trellis arrangement and extending along a length of a back side of the canopy; and
   a plurality of fasteners, connected to a back side of the box like structure and releasably securing the trellis arrangement to the back side of the box like structure.

4. A hydroponic plant growing apparatus providing growing media, light, and water with fertilizer to plants and other vegetation comprising:
   a box like structure;
   a plurality of growing chambers in the box like structure, each chamber having a porous liner filled with a plant growth medium removably placed within;
   a bottom section of the growing chamber tapering downwardly to a filter section that is part of the chamber;
   an airtight plant nutrient tank positioned in said box-like structure;
   a plurality of filters in the filter section comprising:
     a perforated plastic first filter;
     a second filter comprising a screen having a plurality of openings per square centimeter;
     a foam third filter;
     a fourth filter comprising a screen having a plurality of openings per square centimeter;
     a perforated plastic fifth filter; and
   a nutrient transfer tube attached to and passing through a port in the filter section and extending downwardly to said air tight plant nutrient tank.

5. A hydroponic plant growing apparatus as described in claim 4 further comprising:
   a compressed air source and an air line connected to said air source and said tank, said air line being in fluid communication with said source and said tank, said source being capable of pressurizing said tank for forcing fluid from said tank through said tube, said filter section, said liner, and into said growth medium;
   a first seal positioned on said liner to reduce leakage between the liner and the growing chamber;
   a second seal positioned in said tank to reduce leakage between the transfer tube and the tank;
   a third seal positioned around said air line in said tank to reduce leakage between said air line and said tank;
   a relief valve positioned on said tank to depressurize the tank;
   a growing light positioned in light communication with said chambers;
   at least one electronic timing device electrically connected to said relief valve for actuating said valve to allow the tank to be pressurized and depressurized at selected time intervals and at least one electronic timing device electrically connected to said growing light to selectively operate said growing light; and
   an amount of water and nutrients returning to the tank from the chamber after the timer turns off the compressed air source and the relief valve opens to allow the tank to be depressurized.

6. A hydroponic plant growing apparatus providing growing media, light, and water with fertilizer to plants and other vegetation comprising:
   a box like structure;
   a plurality of growing chambers in the box like structure, each chamber having a porous liner filled with a plant growth medium removably placed within;
   a bottom section of the growing chamber tapering downwardly to a filter section that is part of the chamber;
   a plurality of filters in the filter section comprising:
   a perforated plastic first filter;
   a second filter comprising a screen having a plurality of openings per square centimeter;
   a foam third filter;
   a fourth filter comprising a screen having a plurality of openings per square centimeter; and
   a perforated plastic fifth filter; an air tight plant nutrient tank;
   a nutrient transfer tube attached to and passing through a port in the filter section and extending downwardly to said air tight plant nutrient tank in the box like structure;
   a compressed air source and an air line connected to said air source and said tank, said air line being in fluid communication with said source and said tank, said source being capable of pressurizing said tank for forcing fluid from said tank through said tube, said filter section, said liner, and into said growth medium;
   a first seal positioned on said liner to reduce leakage between the liner and the growing chamber;
   a second seal positioned in said tank to reduce leakage between the transfer tube and the tank;
   a third seal positioned around said air line in said tank, to reduce leakage between said air line and said tank;
   a relief valve in a top portion of the plant nutrient tank to depressurize the tank;
   a growing light positioned in light communication with said medium;
   at least one electronic timing device electrically connected to said relief valve to allow the tank to be pressurized and depressurized at selected time intervals and at least one electronic timing device electrically connected to said growing light to selectively operate said growing light;
   an amount of water and nutrients returning to the tank from the chamber after the timer turns off the compressed air source and the relief valve opens to allow the tank to be depressurized;
   at least one telescopic rod attached to and extending from the box like structure to support a canopy containing said growing light;
   a longitudinal, spring loaded, roller containing a pull-down trellis arrangement and extending along a length of a back side of the canopy; and
   a plurality of fasteners, connected to a back side of the box like structure and releasably securing the trellis arrangement to the back side of the box like structure.

7. A method of growing plants and other vegetation comprising:
   providing a box like structure;
   placing a plurality of growing chambers in the box like structure, and removably placing a porous liner filled with a plant growth medium within the chamber;
   providing a bottom section of the growing chamber that tapers downwardly to a filter section that is part of the chamber;
   providing an air tight plant nutrient tank;
   placing a plurality of filters in the filter section comprising:
   a perforated plastic first filter;
   a second filter comprising a screen having a plurality of openings per square centimeter;
   a foam third filter;
   a fourth filter comprising a screen having a plurality of openings per square centimeter; and
   a perforated plastic fifth filter;
   attaching a nutrient transfer tube to the filter section and allowing the tube to pass through a port in the filter section and extending the tube downwardly to said air tight liquid plant nutrient tank in the box like structure.

8. A method of growing plants and other vegetation as described in claim 7 further comprising the steps of:
   placing a first seal, to reduce leakage between the liner and the growing chamber, on the liner;
   placing a second seal, to reduce leakage between the transfer tube and the tank, in the tank;
   providing a compressed air source and an air line connected said source to said tank;
   placing a third seal, to reduce leakage between said air line and said tank, around the line in the tank;
   pressurizing the tank through the line by using the compressed air source, in the box like structure, and forcing nutrients and water through the transfer tube, through the plurality of filters in the filter section, into the chamber, through the liner and into the growth medium;
   providing a relief valve in a top portion of the plant nutrient tank to depressurize the tank;
   placing a growing light in light communication with said medium;
   using at least one electronic timing device, in the box like structure, to allow the tank to be pressurized and depressurized at selected time intervals and at least one electronic timing device to selectively operate said growing light; and
   returning an amount of water and nutrients to the tank from the chamber after the timer turns off the compressed air source and opening the relief valve to allow the tank to be depressurized.

9. A method of growing plants and other vegetation as described in claim 7 comprising:
   attaching to and extending from the box like structure at least one telescopic rod to support a canopy containing said plant growing light;
   placing a longitudinal, spring loaded, roller containing a pull-down trellis arrangement and extending along a length of a back side of the canopy; and
   connecting a plurality of fasteners to a back side of the box like structure and releasably securing the trellis arrangement to the back side of the box like structure.

* * * * *